Dec. 12, 1939.   J. B. SMITH   2,183,414
FISHING ROD TIP PROTECTOR
Filed Feb. 16, 1939
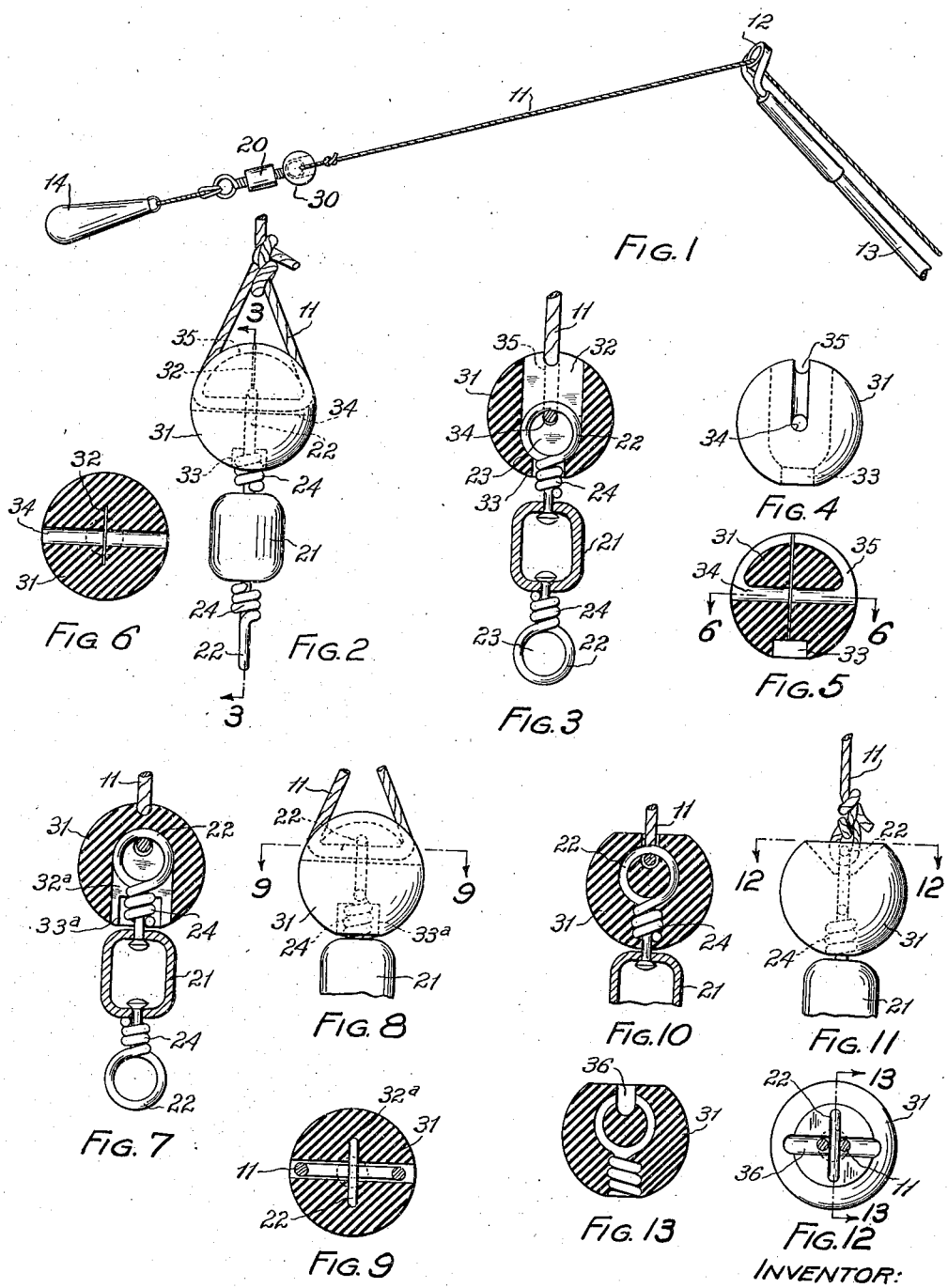
INVENTOR:
JOSEPH B. SMITH
BY Morton S. Brockman
ATTORNEY.

Patented Dec. 12, 1939

2,183,414

UNITED STATES PATENT OFFICE 2,183,414

FISHING ROD TIP PROTECTOR

Joseph B. Smith, Cleveland, Ohio

Application February 16, 1939, Serial No. 256,701

3 Claims. (Cl. 43—28)

This invention relates to fishing and particularly to links or connecting devices for hooks and tackle.

As conducive to a clear understanding of this invention it may be well to point out that certain conventional angling rods have at their tips small agate or glass ring-like guides through which the line passes; and that in most instances the hook or leader is attached to the line with a small metal swivel connector. It often happens that when hastily reeling in line, the end is reached sooner than expected and the metal swivel connector then strikes the agate tip guide often with sufficient force to break it. When this happens a new tip must be installed because its continued use may cut, damage or otherwise obstruct the free movement of the line. Aside from the expense of repairing the rod; the delay and inconvenience is most annoying at a time just when all the tackle and accessories are wanted to be in good condition.

It is therefore an object of this invention to provide a tackle device which will not injure a fishing pole, line or hooks even if carelessly used.

Another object is to provide for a more efficient means of attaching a line to the bait retainers.

A more specific object is to provide a protector or guard device which is a part of a swivel connector or, a buffer device which is attached to a conventional swivel connector as an accessory thereto.

These and other objects and features of the invention will become apparent from a study of the following description and claims together with the accompanying drawing in which like parts are designated by like reference characters and wherein:

Figure 1 is a comprehensive view of the device assembled with other tackle;

Figure 2 is an enlarged view of a preferred form of the invention;

Figure 3 is a similar view showing a vertical section, the view taken along the lines and in the direction of the arrows 3—3 of the Figure 2;

Figure 4 is a plan view of a side of the buffer member only;

Figure 5 is a vertical section of the buffer member only;

Figure 6 is a horizontal section of the buffer member taken along the lines 6—6 of the Figures 4 and 5;

Figure 7 is a side view partly in section of a modified form of the device;

Figure 8 is a partial front elevation of the Figure 7;

Figure 9 is a horizontal section taken along the lines 9—9 of the Figure 8;

Figure 10 is a side view partly in section of a second modified form of the device;

Figure 11 is a side elevation of the second modified form of the device;

Figure 12 is a plan view taken along the lines 12—12 of the Figure 11; and

Figure 13 is a vertical section taken along the lines 13—13 of the Figure 12.

This invention consists generally of two main parts, the swivel member 20 and the buffer member 30 each of which will be described hereinafter. The comprehensive view of Figure 1 shows the members 20 and 30 attached in a conventional manner to the line 11 which passes through the agate ring-like guide 12 of the rod 13; and to the casting plug 14.

The swivel member 20 consists briefly of a body section 21 to which are swivelly connected the loops or links 22, which have openings 23 for engaging the line 11. These swivel members are old to the art and require no lengthy description.

The buffer member constitutes the gist of this invention and consists of a substantially round ball of resilient rubber 31 or of some other suitable material such as cork which will insulate the agate guide 12 from any damaging contact with either the metal links 22 or the body 21.

Extending downwardly and diametrically partially through the ball 31 is a narrow slit 32. Its depth is approximately three-fourths of the diameter of the ball; its length is about the diameter of the link 22 and its width is less than the thickness of the link 22. At the bottom portion of the ball 31 there is a round hole or cavity 33 which engages the neck 24 of the link 22, and which cavity opens into or connects with the slit 32. The bottom of the cavity 33 forms a shoulder or a rest for a portion of the neck 24. Projecting horizontally and through the ball 31 is a round hole 34, which goes completely through the ball 31 and which passes through the link 22. The hole 34 is smooth and large enough to permit the passage therethrough of the line 11 for attachment.

A groove 35 is formed on the perpihery or outside surface of the ball 31 which connects both ends of the hole 34 and which forms a seat or channel for the looped line 11.

The type of buffer illustrated in the Figures 2-6 inclusive is suitable for attachment to the swivel member at the factory. In this type the link 22 must be inserted in the buffer 30 before it is attached to the body 21.

The first modified form of buffer and the one illustrated in the Figures 7, 8 and 9 is suitable for use as an accessory to a conventional swivel member. In this type the opening of the slit 32a does not go all the way through the ball 31 but instead completely ends three-fourths of the way in and the cavity 33a is at the mouth of the slit 32a instead of at its end as in the former type. The hole 34 and groove 35 are substantially the same as in the former model. This modified form may be applied to the link 22 after the link is completely assembled but before the line 11 is tied thereto.

The second modified form as illustrated in the Figures 10-13 inclusive is quite similar to the first embodiment except that the hole 34 and the groove 35 are dispensed with. In substitution therefore and to facilitate threading or stringing a second small cavity 36 is formed at the mouth of the slit 32 which is deep enough to open into the opening 11 and wide enough to permit the line 11 to pass in and out thereof. This latter type is suitable for manufacture where the ball 31, if made of rubber, is molded around the link 22.

It will now be clear that there is provided by this invention a fishing rod tip protector which accomplishes the objects of the invention. While the invention has been described in specific forms and while certain special terms and general language have been used, it is to be understood that the embodiment of the invention as described and shown is suggestive only and is not to be considered in a limiting sense. It is to be further understood that there may be other forms or adaptations of the invention and those modifications are also considered to be within the broad scope of the invention as no limitations upon it are intended other than those imposed thereon by the scope of the appended claims.

I claim:

1. In angling tackle, a guard, comprising a buffer member having a slot therethrough, a hole therethrough intersecting the slot, and a peripheral groove thereon connecting the hole openings.

2. In angling tackle, a guard, comprising a buffer member having a diametrical slot therethrough, a diametrical hole therethrough intersecting the slot, and a peripheral groove thereon connecting the hole and slot openings.

3. In angling tackle, a connector, comprising in combination, a body member, a link swivelly attached to the body member, and a resilient buffer member partially surrounding the link and intercepting the movement of the body member with respect to the other tackle.

4. In angling tackle, a connector, comprising in combination, a body member, a link swivelly attached to the body member, and a buffer member having a slot therethrough, a hole therethrough and a groove thereon.

5. In angling tackle, a connector, comprising in combination, a body member, a link swivelly attached to the body member, a buffer member having a diametrical slot therethrough, a diametrical hole therethrough and a peripheral groove thereon.

6. In angling tackle, a connector, comprising in combination, a body member, a link swivelly attached to the body member, and a buffer member having a slot therethrough, a hole therethrough intersecting the slot and a peripheral groove thereon connecting the hole openings.

7. In angling tackle, a connector, comprising in combination, a body member, a link swivelly attached to the body member, and a buffer member having a diametrical slot therethrough, a diametrical hole therethrough intersecting the slot and a peripheral groove thereon connecting the hole and slot openings.

8. In angling tackle containing a tipped rod, a reeled line, and a separable bait holder, a connector, comprising in combination, a body member, a lower link attached to the body member and engaging the bait holder, an upper link swivelly attached to the body member and engaging the said reeled line, and a resilient buffer member mounted on the upper link in a manner whereby the said tipped rod is protected against a blow by the body member.

JOSEPH B. SMITH.